United States Patent Office

2,810,767
Patented Oct. 22, 1957

2,810,767

DINITRATION OF o-ALKYLPHENOLS

Duane G. Clarke and Charles H. McKeever, Meadowbrook, and Edward L. Wolffe, Willow Grove, Pa., assignors to Rohm & Haas Company, Philadelphia, Pa., a corporation of Delaware No Drawing. Application September 16, 1955, Serial No. 534,891

5 Claims. (Cl. 260—622)

This invention concerns a process for preparing 2,4-dinitro-6-alkylphenols, wherein the alkyl group contains 6 to 12 carbon atoms, in a state of good purity and in good yields.

Introduction of two nitro groups and only two into an alkylphenol is surrounded with a number of difficulties. If conditions are made severe enough to ensure dinitration and thereby avoid any appreciable content of unnitrated phenol or of mono-nitrated phenol, whether the method be based on concentrated nitric acid or mixed acid, considerable oxidation may take place with formation of low boiling oxidation products and colored and resinous bodies. It is not easy or economical to effect separation of these various materials. Much of the same result is observed when the starting alkylphenol is first treated with sulfuric acid of moderate strength followed by addition of sodium nitrate, at temperatures shown in the art for thus effecting nitration.

Slight changes in conditions of the processes described in the art cause considerable variation in the nature of the reaction products. Variations in the products, even though relatively minor, cause marked changes in the behavior and, therefore, the value and utility of these dinitroalkylphenols in agricultural and horticultural applications. In fact some of the untoward and undesirable actions of preparations based on dinitroalkylphenols and their derivatives which appear from time to time are traceable to the presence of by-products and/or impurities. It is, therefore, clearly necessary to develop a process for dinitration of these alkylphenols which is highly reproducible, which avoids by-products and impurities, and which at the same time is economical and efficient. It is also clear that it is highly desirable in the preparation of a dinitroalkylphenol to control and direct nitration to give a high proportion of this desired material and to avoid unnitrated, undernitrated, overnitrated, or oxidized materials. This is aside from consideration of hazards connected with nitration and problems of corrosion, which are inherent and serious factors in any procedure involving nitration. It is also desired to avoid use of special and expensive equipment.

We have discovered a method for preparing 2,4-dinitro-6-alkylphenols from o-alkylphenols with alkyl groups of 6 to 12 carbon atoms in high yields and with an excellent conversion to the dinitro stage with a minimum of unwanted materials, with good safety, and with avoidance of the need of expensive equipment and/or corrosion of stainless steel vessels. Only low cost reactants are consumed without waste of excessive amounts.

Our method comprises first reacting a defined alkylphenol with 88–98% sulfuric acid in molecular excess about room temperature (25°–45° C.) until sulfonation is effected, as indicated by no further heat of reaction or as shown by analysis of the reaction mixture, and adding this sulfonated mixture with agitation to an aqueous 25% to 50% sodium nitrate solution which is at a temperature between 70° and about 100° C. at a rate to maintain the resulting mixture with the aid of cooling within this temperature range and preferably between 75° and 85° C. Layers are allowed to form and are separated. For convenience the organic layer may be taken up in an inert, water-immiscible, volatile organic solvent either before or after its separation to aid in the washing of the product with water. After removal of wash water the solvent is distilled off, if desired, and the product is dried, as by heating under reduced pressure. There is obtained 95% to 98% pure 2,4-dinitro-6-alkylphenol in a yield of 92% to 96%. Unnitrated phenol is essentially absent as are oxidized and resinous materials. Where further purification is desired, charcoaling or extraction may be practiced or, in the case of solids, recrystallization.

The phenols which are useful in this rocess are those having one ortho alkyl substituent of six to twelve carbon atoms and preferably those with six to nine carbon atoms. By minor adjustments in proportions, times, and temperatures, this process can be readily adapted to any of these alkylphenols for optimum yields, minimum presence of undesired materials, and minimum corrosion of stainless steel vessels.

Typical alkylphenols to be dinitrated include ortho-n-hexylphenol, o-2-ethylbutylphenol, o-n-heptylphenol, o-1,3,3-trimethylbutylphenol, o-n-octylphenol, o-1-methylheptylphenol, o-n-nonylphenol, o-isononylphenol, o-2,4,4-trimethylpentylphenol, o-2,5,5-trimethylhexylphenol, o-decylphenol, o-dodecylphenol, and o-isodecylphenol. There may likewise be used mixtures of o-alkylphenols. There should particularly be mentioned the commercial caprylphenol which contains o-1-methylheptylphenol with some o-octylphenol.

The ratio of sulfuric acid to o-alkylphenol may vary from about 2.2 moles to 6 moles of sulfuric acid per mole of alkylphenol and is preferably 2.5 moles to 3.5 moles of sulfuric acid per mole of alkylphenol. The ratio of sodium nitrate to alkylphenol is from about 2:1 to 4:1 and is preferably 2.2:1 to about 3.1:1.

In the following illustrative examples additional details of procedure will be found. Parts shown are by weight unless otherwise noted.

Example 1

There are mixed with stirring 206 parts of o-caprylphenol and 316 parts of 93% sulfuric acid over a period of 1.5 hours at a temperature of about 35° C. Although two layers tend to form this reaction mixture is stirred and slowly added to an aqueous 40% sodium nitrate solution containing 213 parts of sodium nitrate heated to 80° C. and maintained at 80°–90° C. during the addition. The resulting reaction mixture is held at 80° to 85° C. for a half hour with stirring. It is then allowed to form layers and is cooled to 60° C., whereupon the layers are separated. The organic layer is washed twice with water containing a little methanol as this accelerates separation of the water layer. The wet product is dried under reduced pressure and heated to about 100° C. The dried material is about 96% pure 2,4-dinitro-6-caprylphenol. No unnitrated caprylphenol is present. This method avoids attack on stainless steel apparatus by carrying out the sulfonation step with strong sulfuric acid and low temperature. The product is unusually pure for this type of material and requires no further purification for use in agricultural sprays or as an intermediate for the manufacture of esters or amine salts. The yield in the above procedure will average at least 93%. Furthermore, this process avoids the peculiar secondary exothermic reaction which may occur where mixed acids are used. This secondary reaction has been known to cause the reaction to get out of control.

Example 2

There are slowly mixed 178 parts of o-hexylphenol (from the reaction of hexene and excess phenol on an acid clay catalyst) and 331 parts of 89% sulfuric acid. The mixture is stirred and heated over a period of an hour to 40° C. The stirred mixture is slowly added to 490 parts of an aqueous 50% sodium nitrate solution at 85° C. This mixture is stirred and heated at 85°–95° C. for a half hour and then allowed to stand. Layers form. Naphtha is added thereto. The organic layer is taken and washed with water. The washed material is heated under reduced pressure to leave 255 parts of a brownish oil, which is 2,4-dinitro-6-hexylphenol. It can be used in agricultural sprays in this form or converted to its amine salts and thus used or esterified with a carboxylic acid halide for use in this form as a pesticide.

Example 3

In place of the o-hexylphenol of Example 2, there are used 262 parts of o-dodecylphenol. The same procedure is followed to give 340 parts of a yellow product, an oil, 2,4-dinitro-6-dodecylphenol. The same procedure is followed with an equal weight of o-isododecylphenol to give 341 parts of a yellow product, also an oil, 2,4-dinitro-6-isododecylphenol which is an especially useful phenol for preparing pesticidal products.

Example 4

The procedure of Example 2 was repeated with substitutions of 220 parts of ortho-nonylphenol, the nonyl group being the 3,5,5-trimethylhexyl group. The dinitrated product, an amber oil, was obtained in a yield of 95%, practically free from unnitrated phenol or mononitrated phenol.

We claim:

1. A process for preparing dinitroalkylphenols of the formula

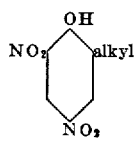

where the alkyl group contains 6 to 12 carbon atoms, which comprises reacting together at a temperature between 25° and 45° C. an o-alkylphenol, in which the alkyl portion contains 6 to 12 carbon atoms, and 80% to 98% sulfuric acid in a molar ratio of said acid to said phenol from 2.2:1 to 6:1 adding the resulting sulfonated mixture to an aqueous 25% to 50% sodium nitrate solution maintained at a temperature between 70° and about 100° C., the molar ratio of sodium nitrate to o-alkylphenol being 2:1 to 4:1, reacting it therewith at a temperature between 70° and about 100° C., and separating the resulting dinitroalkylphenol.

2. A process for preparing 2,4-dinitro-6-(1-methylheptyl)phenol which comprises reacting together at a temperature between 25° and 45° C. o-(1-methylheptyl)-phenol and 88% to 98% sulfuric acid in a molar ratio of said acid to said phenol from 2.5:1 to 3.5:1 adding the resulting sulfonated mixture to an aqueous 25% to 50% sodium nitrate solution maintained at a temperature between 70° and about 100° C., the molar ratio of sodium nitrate to o-(1-methylheptyl)phenol being 2.2:1 to 3.1:1, reacting it therewith at a temperature between 70° and about 100° C., and separating the resulting 2,4-dinitro-6-(1-methylheptyl)phenol.

3. A process for preparing 2,4-dinitro-6-(3,5,5-trimethylhexyl)phenol which comprises reacting together at a temperature between 25° and 45° C. o-(3,5,5-trimethylhexyl)phenol and 88% to 98% sulfuric acid in a molar ratio of said acid to said phenol from 2.5:1 to 3.5:1, adding the resulting sulfonated mixture to an aqueous 25% to 50% sodium nitrate solution maintained at a temperature between 70° and about 100° C., the molar ratio of sodium nitrate o-(3,5,5-trimethylhexyl)phenol being 2.2:1 to 3.1:1, reacting it therewith at a temperature between 70° and about 100° C., and separating the resulting 2,4-dinitro-6-(3,5,5-trimethylhexyl)phenol.

4. A process for preparing 2,4-dinitro-6-hexylphenol which comprises reacting together at a temperature between 25° and 45° C. o-hexylphenol and 88% to 98% sulfuric acid in a molar ratio of said acid to said phenol from 2.5:1 to 3.5:1, adding the resulting sulfonated mixture to an aqueous 25% to 50% sodium nitrate solution maintained at a temperature between 70° and about 100° C., the molar ratio of sodium nitrate to o-hexylphenol being 2.2:1 to 3.5:1, reacting it therewith at a temperature between 70° and about 100° C., and separating the resulting 2,4-dinitro-6-hexylphenol.

5. A process for preparing 2,4-dinitro-6-isododecylphenol which comprises reacting together at a temperature between 25° and 45° C. o-isododecylphenol and 88% to 98% sulfuric acid in a molar ratio of said acid to said phenol from 2.5:1 to 3.5:1, adding the resulting sulfonated mixture to an aqueous 25% to 50% sodium nitrate solution maintained at a temperature between 70° and about 100° C., the molar ratio of sodium nitrate to said phenol being 2.2:1 to 3.1:1, reacting it therewith at a temperature between 70° and about 100° C., and separating the resulting 2,4-dinitro-6-isododecylphenol.

References Cited in the file of this patent

UNITED STATES PATENTS

| | | |
|---|---|---|
| 1,309,320 | Ellis et al. | July 8, 1919 |
| 2,192,197 | Mills et al. | Mar. 5, 1940 |
| 2,325,753 | Dolt et al. | Aug. 31, 1943 |

UNITED STATES PATENT OFFICE

CERTIFICATE OF CORRECTION

Patent No. 2,810,767                                                              October 22, 1957

Duane G. Clarke et al.

It is hereby certified that error appears in the printed specification of the above numbered patent requiring correction and that the said Letters Patent should read as corrected below.

Column 3, line 48, for "80%" read -- 88% --.

Signed and sealed this 3rd day of December 1957.

(SEAL)

Attest:

KARL H. AXLINE

Attesting Officer

ROBERT C. WATSON
                                                                            Commissioner of Patents